(12) United States Patent
Patterson (10) Patent No.: US 7,806,461 B2
(45) Date of Patent: Oct. 5, 2010

(54) APPARATUS AND METHOD FOR PROVIDING TINTED WINDOWS

(76) Inventor: Christopher Patterson, P.O. Box 5000, Pekin, IL (US) 61555-5000

( * ) Notice: Subject to any disclaimer, the term of this patent is extended or adjusted under 35 U.S.C. 154(b) by 690 days.

(21) Appl. No.: 11/742,624

(22) Filed: May 1, 2007

(65) Prior Publication Data

US 2007/0200387 A1 Aug. 30, 2007

(51) Int. Cl.
*B60J 5/04* (2006.01)
(52) U.S. Cl. ................ 296/146.2; 296/97.9; 296/97.11; 49/502; 49/63; 49/171
(58) Field of Classification Search ............ 296/146.16, 296/97.1, 152, 7.99, 97.9, 97.11, 146.2; 49/63, 49/502, 171
See application file for complete search history.

(56) References Cited

U.S. PATENT DOCUMENTS

| | | | |
|---|---|---|---|
| 1,684,690 A | 9/1928 | Steger | 296/97.8 |
| 2,363,762 A | 11/1944 | Wardan | 296/97.8 |
| 3,363,666 A | 1/1968 | Hodgson et al. | 160/23.1 |
| 4,261,411 A | 4/1981 | Dieterich | 160/290.1 |
| 4,570,991 A | 2/1986 | Lystad | 296/97 |
| 4,671,558 A | 6/1987 | Cline | 296/97 |
| 4,758,041 A | 7/1988 | Labeur | 296/97 |
| 4,823,859 A | 4/1989 | Park | 160/370.2 |
| 4,913,211 A | 4/1990 | Eskandry et al. | 160/84.1 |
| 4,921,299 A | 5/1990 | Herrick | 296/978 |
| 4,932,710 A | 6/1990 | Chen | 296/97.3 |
| 5,060,361 A | 10/1991 | Grimes | 29/450 |
| 5,133,585 A | 7/1992 | Hassan | 296/975 |
| 5,165,188 A * | 11/1992 | Tsiros | 49/63 |
| 5,284,198 A | 2/1994 | Kauka | 296/97.8 |
| 5,344,206 A | 9/1994 | Middleton | 296/97.8 |
| 5,409,284 A | 4/1995 | Mahler | 296/97.4 |
| 5,575,524 A | 11/1996 | Cronk | 296/142 |
| 2003/0025354 A1 * | 2/2003 | Akintan et al. | 296/146.16 |

OTHER PUBLICATIONS

"Driver's Notebook", The Robb Report Collection, Feb. 2007, "Safety Cabrio", pp. 38-40.

* cited by examiner

*Primary Examiner*—Joseph D Pape
(74) *Attorney, Agent, or Firm*—Walter J. Tencza, Jr.

(57) ABSTRACT

A first substantially transparent window, a tinted window, and a tinted window moving device may be provided in an automobile. The tinted window moving device can be controlled to place the tinted window in a first state or a second state. In the first state the tinted window is substantially aligned with the first substantially transparent window so that in order to see out of the first substantially transparent window, an individual must look through the tinted window also. In the second state the tinted window is not substantially aligned with the first substantially transparent window, so that an individual can see out of the first substantially transparent window without looking through the tinted window also.

16 Claims, 6 Drawing Sheets

shows a cross sectional view of an apparatus in

APPARATUS AND METHOD FOR PROVIDING TINTED WINDOWS

FIELD OF THE INVENTION

This invention relates to improved methods and apparatus concerning tinted windows for automobiles.

BACKGROUND OF THE INVENTION

There are various devices known in the prior art for providing tinted windows for automobiles. Tinted windows provide a pleasing look to an automobile, keep glaring sunlight out of the eyes of a driver, and passengers, and provide a measure of privacy to occupants of the automobile. However, at night or during bad weather, tinted windows make it difficult to see out of the automobile.

SUMMARY OF THE INVENTION

One embodiment of the present invention provides an apparatus comprising a first substantially transparent window, a tinted window, and a tinted window moving device. The tinted window moving device can be controlled to place the tinted window in a first state or a second state. In the first state the tinted window is substantially aligned with the first substantially transparent window so that in order to see out of the first substantially transparent window, an individual must look through the tinted window also. In the second state the tinted window is not substantially aligned with the first substantially transparent window, so that an individual can see out the first substantially transparent window without looking through the tinted window also.

The tinted window, the first substantially transparent window, and the tinted window moving device may be part of an automobile. The tinted window moving device may include a motor which can move the tinted window into substantial alignment with the first substantially transparent window. The automobile may include a car door having a car door body. The tinted window moving device can move the tinted window into and out of the car door body.

A device may be provided, which allows the tinted window to slide closely adjacent to the first substantially transparent window without damaging either the tinted window or the first substantially transparent window. The device which allows the tinted window to slide may include felt or rollers.

The apparatus may include a second substantially transparent window which is substantially parallel to the first substantially transparent window. In the first state, the tinted window may be substantially aligned with the first and the second substantially transparent windows so that in order to see out of the first and the second substantially transparent windows, an individual must look through the tinted window also. In the first state, the tinted window may be located between the first and the second substantially transparent windows. In the second state the tinted window may not be substantially aligned with the first and the second substantially transparent windows, so that an individual can see out the first and the second substantially transparent windows without looking through the tinted window also.

The apparatus may include tracks, and the tinted window moving device can cause the tinted window to move along the tracks in order to move the tinted window from the first state to the second state, and from the second state to the first state.

In one embodiment a method is provided including controlling movement of a tinted window so that it is placed in a first state or a second state, which may be as previously described.

DETAILED DESCRIPTION OF THE DRAWINGS

Figure 1:
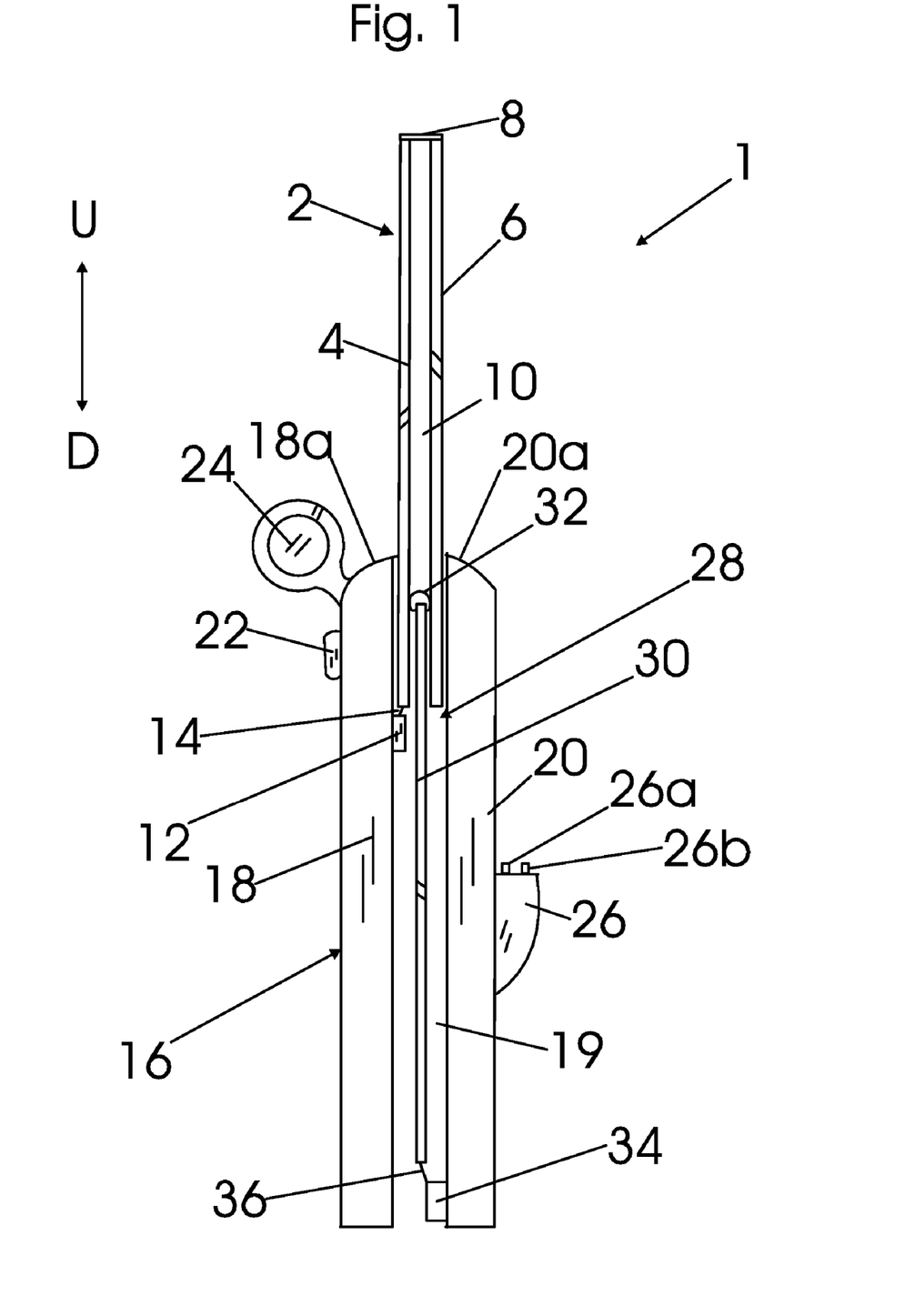
FIG. 1 shows a cross sectional view of an apparatus in accordance with an embodiment of the present invention.

FIG. 1 shows a cross sectional view of an apparatus 1 in accordance with an embodiment of the present invention. The apparatus 1 may be or may be part of a door for an automobile, such as a driver's side, or passenger's side door. The apparatus 1 includes window device 2, tinted window 30, and door device 16. Window device 2 is comprised of window 4 and window 6, which are fixed together by top and sides edge seal and parallel brace 8. The windows 4 and 6 are typically clear and non-tinted. There is an air gap 10 shown between window 4 and window 6. The seal and brace 8 keeps debris from coming into the gap 10. The windows 4 and 6 are typically sealed at the top by seal and brace 8 and sides (not shown) to prevent moisture and debris from interfering with visibility.

The door device 16 is comprised of a door panel 18 and a door panel 20. There is typically a gap 19 between the door panel 18 and the door panel 20. The gap 19 may need to be wider than the gap in prior automobiles in order to accommodate windows 4, 6, and tinted window 30. The door panels 18 and 20 may be the exterior and interior, respectively, door panels of a driver's side door or passenger door, for example, of an automobile. A mirror 24 and a door-opening device 22, such as a door handle, are fixed to the door panel 18, typically on the outside of an automobile. A control apparatus 26, which may include control buttons and/or activation devices 26a and 26b and further buttons or activation devices, may be fixed to the door panel 20.

A motor 12 which may be a typical window motor for an automobile, is shown in a simplified form. The motor 12 is typically mechanically connected to the window device 2 through device 14 which allows the motor 12 to move the window device 2 upwards in the direction U or downwards in the direction D, within limits. The window device 2 is shown at its furthest extent in the upward direction in FIG. 1. The window device 2 can be moved downward by the motor 12 until the seal and brace 8 is substantially even with the top surfaces 18a and 20a of the door panels 18 and 20, respectively.

The tinted window 30, includes or has attached thereto, a device 32. The device 32 helps the tinted window 30 to slide through the gap 10 without scratching, damaging, or being substantially impeded by the windows 4 and 6. The device 32 may be a felt strip or a plurality of felt strips, or small rollers. Felt strips placed around the edges of the tinted window 30 allow for a smooth movement of the tinted window 30, as well as space reduction when all the windows 4, 6, and 30 are deployed and in alignment. Felt strips or small rollers for the device 32 allow the windows 4, 6, and 30 to be drawn tightly together so as not to look like three separate windows. The device 32 may instead or additionally be comprised of rollers.

The tinted window 30 and the device 32 may considered to be part of an overall tinted window device 28. A motor 34 can be used to push the tinted window 30 up in the direction U or down in the direction D. The motor 34 is typically mechanically connected to the tinted window 30 through a device 36 which allows the motor 34 to move the tinted window 30 in the direction U or D, within limits. The tinted window 30 is shown at its lowest point in FIG. 1, and cannot be moved downwards in the direction D any further.

In operation, an individual in an automobile, would press one of the buttons 26a or 26b to cause the tinted window 30 to move into the gap 10 between the windows 4 and 6. An individual would thus be able to place the tinted window 30 completely between windows 4 and 6, so that when looking out of windows 6 and 4, the individual would be looking through tinted window 30. The individual can also press one of buttons 26a or 26b to cause the tinted window 30 to slide back down into the position shown in FIG. 1 between door panels 18 and 20.

The control apparatus 26 may include the typical stock control panel for controlling transparent windows known in the art, with an added feature of a control device for controlling the motor 34 and thus the movement of the tinted window 30 in accordance with an embodiment of the present invention.

Figure 2:
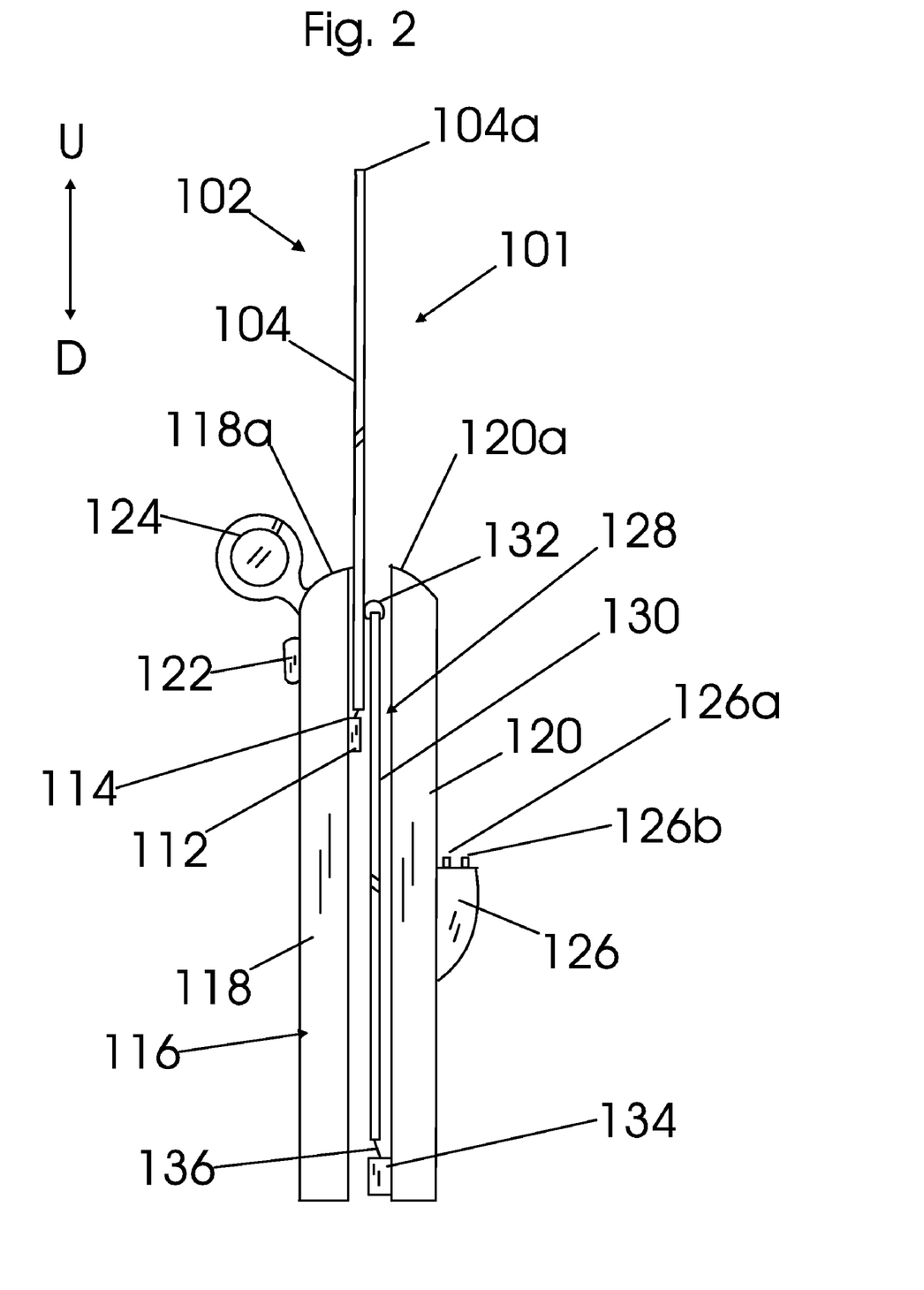
FIG. 2 shows a cross sectional view of an apparatus in accordance with another embodiment of the present invention.

FIG. 2 shows a cross sectional view of an apparatus 101 in accordance with another embodiment of the present invention. The apparatus 101 may be or may be part of a driver's side door or passenger's door of an automobile. The apparatus 101 includes window device 102, tinted window 130, and door device 116. Window device 102 is comprised of window 104. The window 104 is typically clear and non-tinted.

The door device 116 is comprised of a door panel 118 and a door panel 120. The door panels 118 and 120 may be the exterior and interior, respectively, door panels of a door of an automobile. A mirror 124 and a door-opening device 122, such as a door handle, are fixed to the door panel 118, typically on the outside of an automobile. A control apparatus 126, which may include control buttons and/or activation devices 126a and 126b and further buttons or activation devices, may be fixed to the door panel 120.

A motor 112 which may be a typical window motor for an automobile, is shown in a simplified form. The motor 112 is typically mechanically connected to the window device 102 through device 114 which allows the motor 112 to move the window device 102 upwards in the direction U or downwards in the direction D, within limits. The window device 102 and window 104 is shown at its furthest extent in the upward direction in FIG. 2. The window device 102 can be moved downward by the motor 112 until a top edge 104a of the window 104 is substantially even with the top surfaces 118a and 120a of the door panels 118 and 120, respectively.

The tinted window 130, includes or has attached thereto, a device 132. The device 132 helps the tinted window 130 to slide alongside the non-tinted window 104 without scratching, damaging, or being substantially impeded by the window 104. The device 132 may be a felt strip or small rollers. The tinted window 130 and the device 132 may considered to be part of an overall tinted window device 128. A motor 134 can be used to push the tinted window 130 up in the direction U or down in the direction D. The motor 134 is typically mechanically connected to the tinted window 130 through a device 136 which allows the motor 134 to move the tinted window 130 in the direction U or D, within limits. The tinted window 130 is shown at its lowest point in FIG. 2, and cannot be moved downwards in the direction D any further.

In operation, an individual in an automobile, would press one of the buttons 126a or 126b to cause the tinted window 130 to move upwards alongside the transparent or non-tinted window 104. An individual would thus be able to place the tinted window 130 substantially completely aligned and/or parallel to the window 104, so that when looking out of window 104, the individual would be looking through tinted window 130. The individual can also press one of buttons 126a or 126b to cause the tinted window 130 to slide back down into the position shown in FIG. 2 between door panels 118 and 120.

The motor 112 for the clear window 104, can be controlled, in accordance with an embodiment of the present invention, so that the motor 112 will not lower the window 104 while the tinted window 130 is raised (i.e. aligned with the window 104 in the position shown in FIG. 2), without the tinted window 130 lowering with it. This prevents debris from getting between the windows 104 and 130. In another embodiment the control apparatus 126 may include an override switch, which may allow the window 104 to be lowered while the tinted window 130 is raised for cleaning purposes of.

Figure 3:
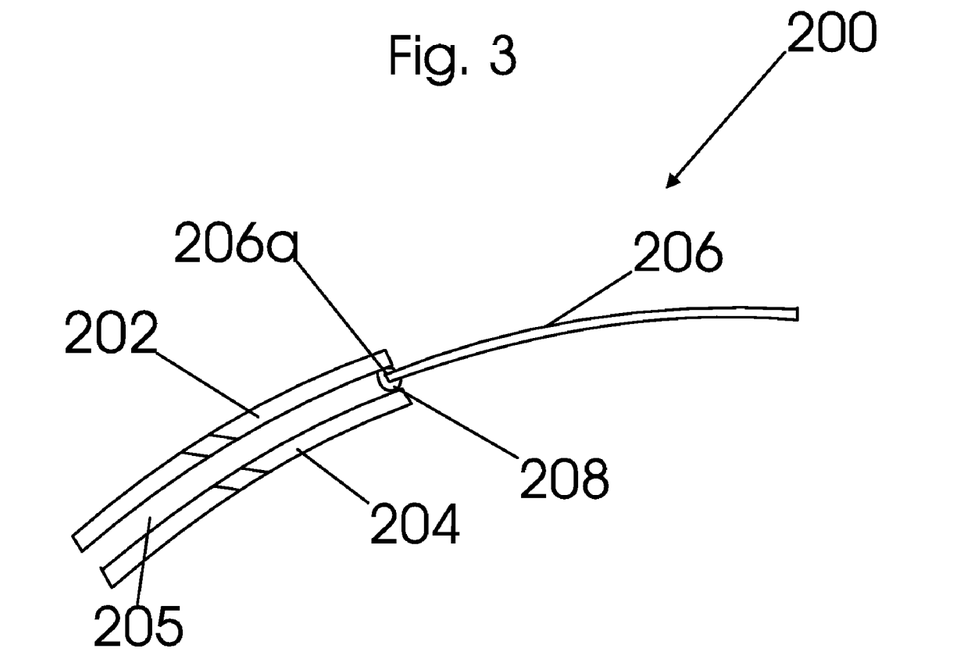
FIG. 3 shows a cross sectional view of the apparatus of FIG. 1.

FIG. 3 shows a cross sectional view of an apparatus 200 in accordance with another embodiment of the present invention. The apparatus 200 includes a window 202 and a window 204. The windows 202 and 204 may be clear and non-tinted. The windows 202 and 204 may be fixed together so that they are parallel to each other. There is a gap 205 between the windows 202 and 204. The apparatus 200 also includes a tinted window 206. The tinted window has attached to an end 206a, a device 208. The device 208 helps the window 206 to slide into the gap 205 without damaging the windows 202 and 204. The tinted window 206 can slide into the gap 205 so that it can be substantially aligned with the windows 202 and 204.

Figure 4:
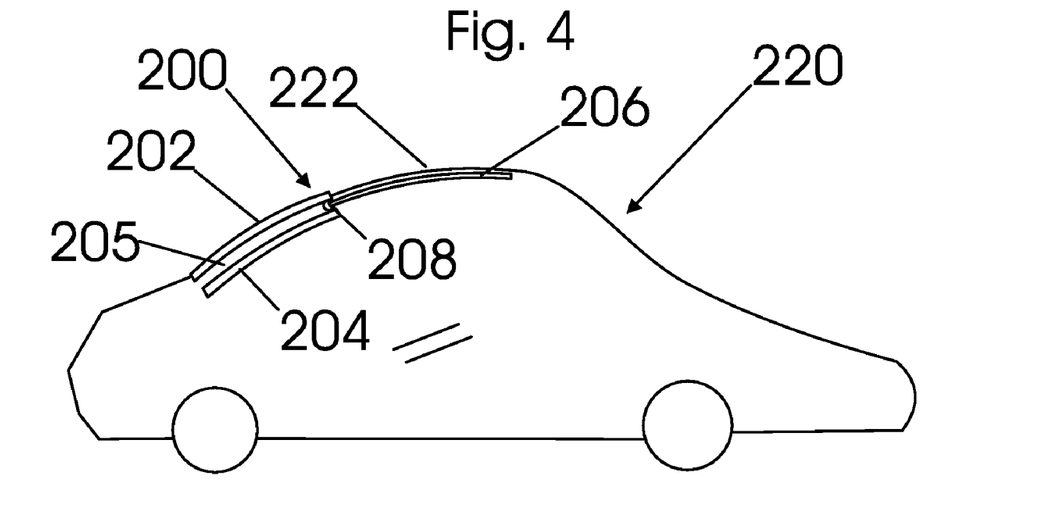
FIG. 4 shows the apparatus of FIG. 3 inserted into an automobile.

FIG. 4 shows a simplified diagram of the apparatus 200 inserted into an automobile 220. The tinted window 206 lies below a roof 222 of the automobile 220. The tinted window 206 can slide into the gap 205 so that an individual looking out of automobile 220 through windows 204 and 202 would also be looking through tinted window 206.

Figure 5:
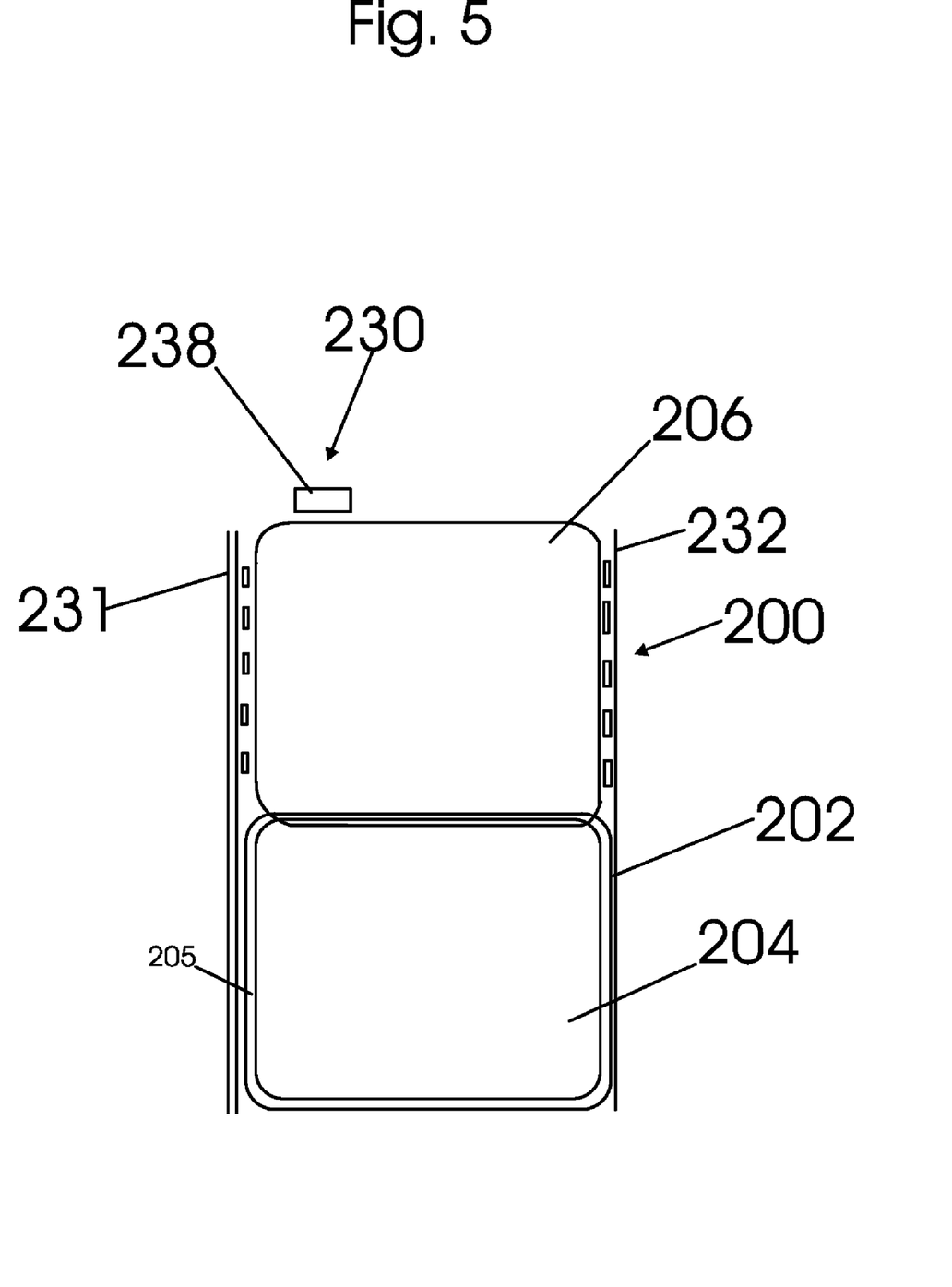
FIG. 5 shows a top view of the apparatus of FIG. 3.

FIG. 5 shows a top view of the apparatus 200 of FIG. 3 along with a system 230. The system 230 is comprised of tracks 231 and 232, and a motor 238. In operation, the motor 238 can be activated to electronically move the tinted window 206 along tracks 231 and 232 to align the tinted window 206 with the windows 202 and 204 in the gap 205.

Each of the windows 202 and 204 may be transparent glass, sealed and spaced. The windows 202, 204, and 206 may have the same curvature. The system 230 may be a system such as employed for a retractable sunroof. Typically when raised the tinted window 206 will be positioned in the roof 222 of the automobile 220. Then when deployed tinted window 206 will lower from the roof 222 by a motor inside the roof 222. In cases where the rear window is moveable (such as sport utility vehicles, station wagons, etc.) the stock motor currently used in automobiles is retained to move the transparent windows (202 and 204) operation and a separate motor is used to move the tinted window 206. In such cases, the additional separate motor (not shown) can be placed in the rear door/hatch of the automobile such as automobile 220.

The device 208, which may include felt strips placed around the edges of the tinted window 206, allows for a smooth movement of the tinted window 206, as well as space reduction when all the windows, such as 202, 204, and 206, are deployed.

Figure 6:
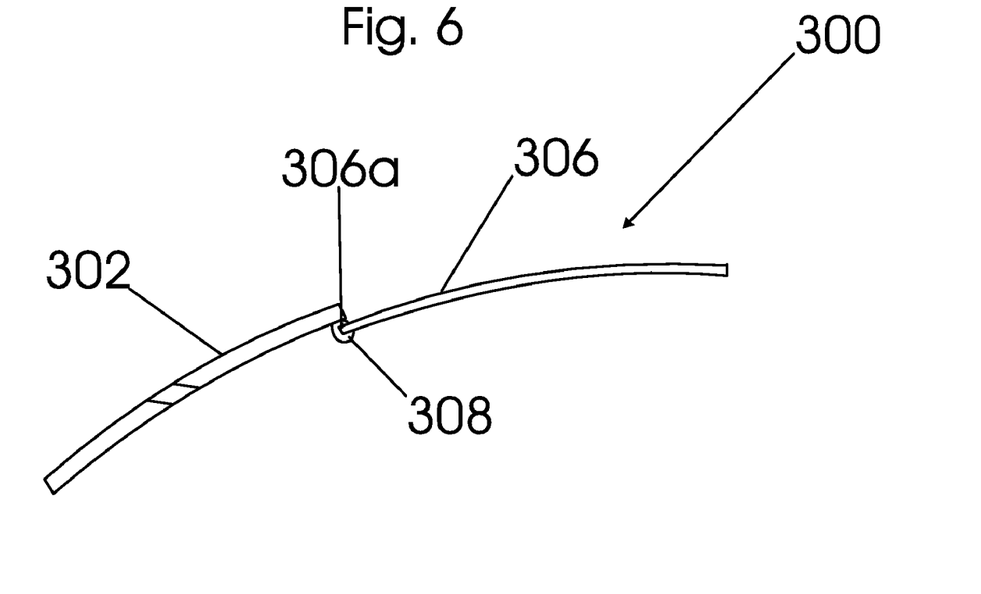
FIG. 6 shows a cross sectional view of the apparatus of FIG. 2.

FIG. 6 shows a cross sectional view of an apparatus 300 in accordance with another embodiment of the present invention. The apparatus 300 includes a window 302, which is typically clear and non-tinted, and a tinted window 306. The tinted window 306 has attached to an end 306a, a device 308. The device 308 helps the window 306 to slide without damaging the window 302. The tinted window 306 can slide so that it can be substantially aligned with the window 302.

Figure 7:
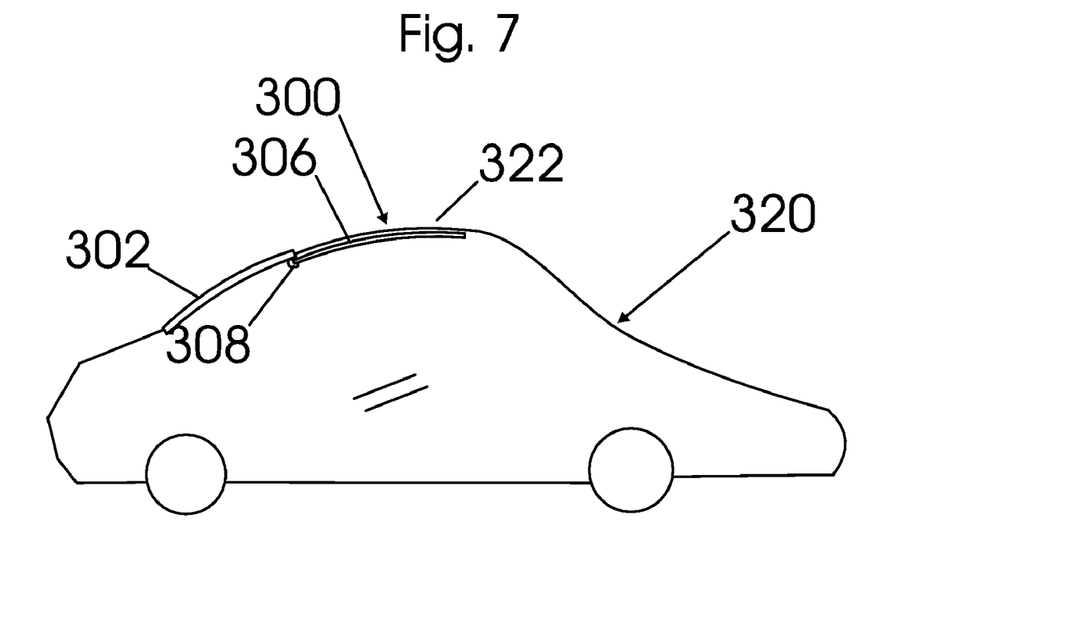
FIG. 7 shows the apparatus of FIG. 6 inserted into an automobile.

FIG. 7 shows a simplified diagram of the apparatus 300 inserted into an automobile 320. The tinted window 306 lies below a roof 322 of the automobile 320. The tinted window 306 can slide into alignment with the window 302 so that an individual looking out of automobile 320 through window 302 would also be looking through tinted window 306.

Figure 8:
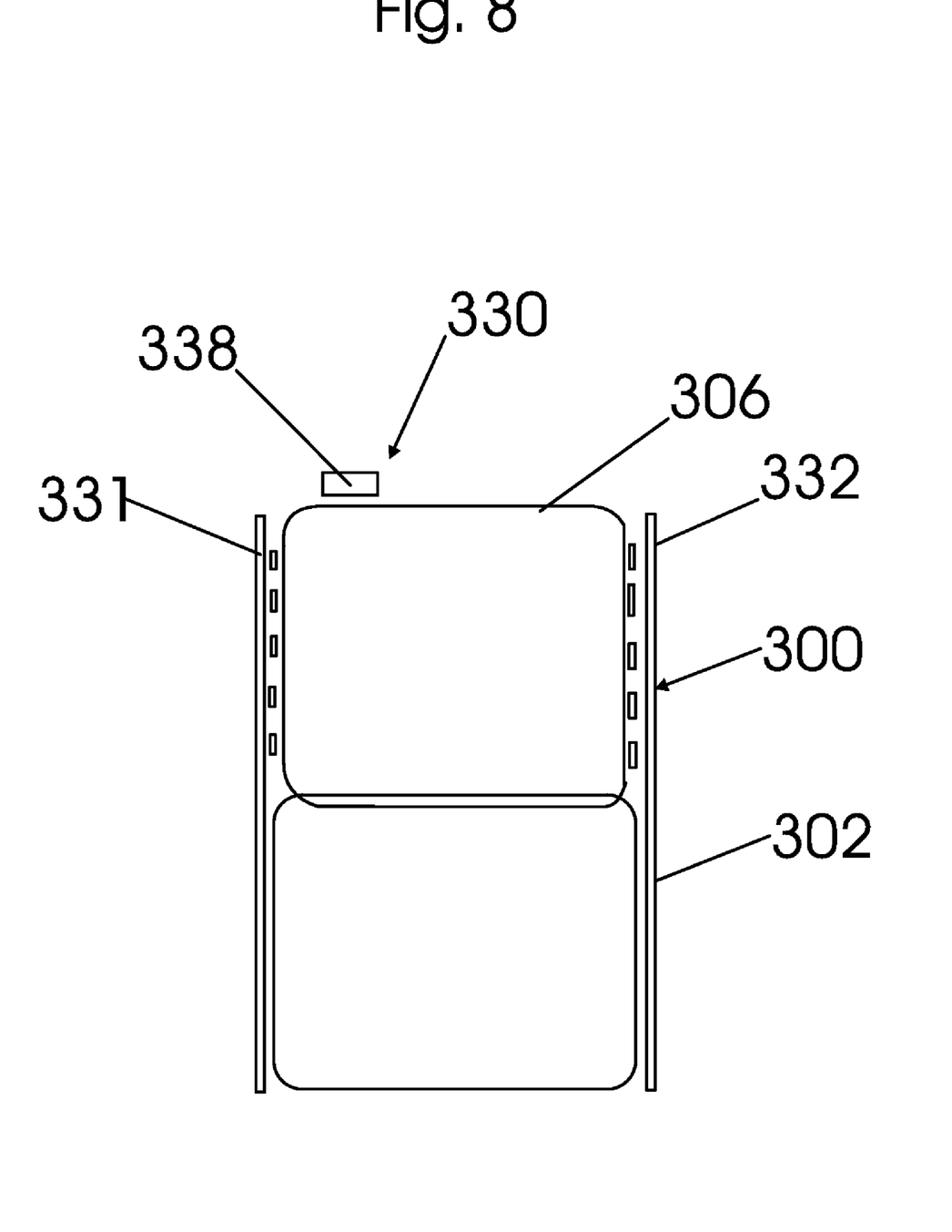
FIG. 8 shows a top view of the apparatus of FIG. 7.

FIG. 8 shows a top view of the apparatus 300 of FIG. 6 along with a system 330. The system 330 is comprised of tracks 331 and 332, and a motor 338. In operation, the motor 338 can be activated to move the tinted window 306 along tracks 331 and 332 to align the tinted window 306 with the window 302. The motor 338 moves the window 306 along tracks 331 and 332 electronically.

FIGS. 3-8 provide examples for a rear window situation. Typically rear transparent windows, such as windows 202, 204, and 302 are fixed. In these cases only one motor is needed, which is used for moving the tinted window, such as window 206 or 306. However, in the case where a rear window raises and lowers (such as in some sport utility vehicles, station wagons, and other automobiles) then two motors are needed.

For any of the embodiments shown in FIGS. 1-8, separate clear window controls (if needed) and tinted window controls can be provided at each door panel (such as driver's side door, front passenger side door, and rear passenger doors). A master control for all tinted and non-tinted windows can be provided at a master control at the driver's door.

The tinted windows, such as 30, 130, 206, and 306, may be comprised of a polycarbonate material. This material is durable, lighter and safer than glass, yet has the same clarity as glass. However, glass can also be used for the tinted windows 30, 130, 206, and 306.

One or more embodiments of the present invention provide a superior alternative to typical tinted windows, which cannot be lowered but rather are permanently fixed in a specific position. In jurisdictions where tinted windows are illegal for driving, tinted windows 30, 130, 206 or 306 can be lowered but can be deployed while parked to protect the vehicle. Tinted windows hinder easy viewing of an interior of an automobile and thus act as a deterrent to would be thieves. Tinted windows also aid in keeping the interior of a vehicle cooler.

The tinted window system of embodiments of the present invention can be applied to automobiles, sport utility vehicles, trains, planes, buses, limousines, armored vehicles, commercial vehicles, and boats, such as yachts.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
a first substantially transparent window; and
a tinted window; and
a tinted window moving device; and
wherein the tinted window moving device can be controlled to place the tinted window in a first state or a second state;
wherein in the first state the tinted window is substantially aligned with the first substantially transparent window so that in order to see out of the first substantially transparent window, an individual must look through the tinted window also; and
wherein in the second state the tinted window is not substantially aligned with the first substantially transparent window, so that an individual can see out the first substantially transparent window without looking through the tinted window also; and
further comprising
a second substantially transparent window which is substantially parallel to the first substantially transparent window; and
wherein in the first state the tinted window is substantially aligned with the first and the second substantially transparent windows so that in order to see out of the first and the second substantially transparent windows, an individual must look through the tinted window also;
wherein in the first state the tinted window is located between the first and the second substantially transparent windows; and
wherein in the second state the tinted window is not substantially aligned with the first and the second substantially transparent windows, so that an individual can see out the first and the second substantially transparent windows without looking through the tinted window also.

2. The apparatus of claim 1 further comprising
an automobile; and
wherein the tinted window, the first substantially transparent window, and the tinted window moving device are part of the automobile.

3. The apparatus of claim 1 wherein
the tinted window moving device includes a motor which can move the tinted window into substantial alignment with the first substantially transparent window.

4. The apparatus of claim 2 wherein
the automobile includes a car door having a car door body; and
wherein the tinted window moving device can move the tinted window into and out of the car door body.

5. The apparatus of claim 1 further comprising
a device which allows the tinted window to slide closely adjacent to the first substantially transparent window without damaging either the tinted window or the first substantially transparent window.

6. The apparatus of claim 5 wherein
the device which allows the tinted window to slide includes felt.

7. The apparatus of claim 5 wherein
the device which allows the tinted window to slide includes rollers.

8. The apparatus of claim 1 further comprising
tracks; and
wherein the tinted window moving device can cause the tinted window to move along the tracks in order to move the tinted window from the first state to the second state, and from the second state to the first state.

9. A method comprising:
controlling movement of a tinted window so that it is placed in a first state or a second state;
wherein in the first state the tinted window is substantially aligned with a first substantially transparent window so that in order to see out of the first substantially transparent window, an individual must look through the tinted window also; and wherein in the second state the tinted window is not substantially aligned with the first substantially transparent window, so that an individual can see out the first substantially transparent window without looking through the tinted window also; and further comprising wherein in the first state the tinted window is substantially aligned with the first substantially transparent window and a second substantially transparent window so that in order to see out of the first and the second substantially transparent windows, an individual must look through the tinted window also;

wherein in the first state the tinted window is located between the first and the second substantially transparent windows; and wherein in the second state the tinted window is not substantially aligned with the first and the second substantially transparent windows, so that an individual can see out the first and the second substantially transparent windows without looking through the tinted window also;

and wherein the first and the second substantially transparent windows are substantially parallel to each other.

10. The method of claim 9 further comprising wherein the tinted window, the first substantially transparent window, and the tinted window moving device are part of an automobile.

11. The method of claim 9 wherein the tinted window moving device includes a motor which can move the tinted window into substantial alignment with the first substantially transparent window.

12. The method of claim 10 wherein the automobile includes a car door having a car door body; and wherein the tinted window moving device can move the tinted window into and out of the car door body.

13. The method of claim 9 further comprising providing a device which allows the tinted window to slide closely adjacent to the first substantially transparent window without damaging either the tinted window or the first substantially transparent window.

14. The method of claim 13 wherein the device which allows the tinted window to slide includes felt.

15. The method of claim 13 wherein the device which allows the tinted window to slide includes rollers.

16. The method of claim 9 further comprising moving the tinted window along tracks in order to move the tinted window from the first state to the second state, and from the second state to the first state.

* * * * *